United States Patent
Hatano

(10) Patent No.: US 7,351,298 B2
(45) Date of Patent: Apr. 1, 2008

(54) METHOD FOR WELDING TAPE CARTRIDGE REEL

(75) Inventor: Yasushi Hatano, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 374 days.

(21) Appl. No.: 11/043,117

(22) Filed: Jan. 27, 2005

(65) Prior Publication Data
US 2005/0194491 A1    Sep. 8, 2005

(30) Foreign Application Priority Data
Mar. 3, 2004    (JP)    ............... 2004-059334

(51) Int. Cl.
B32B 37/00    (2006.01)
(52) U.S. Cl. .................. 156/73.1; 156/64; 156/292
(58) Field of Classification Search ............ 156/64, 156/73.1, 290, 292, 308.2, 308.4, 580.1, 156/580.2; 228/110.1, 1.1
See application file for complete search history.

(56) References Cited

U.S. PATENT DOCUMENTS
6,979,376 B2 * 12/2005 Nuss ..................... 156/64

FOREIGN PATENT DOCUMENTS
JP    2000-173229 A    6/2000

* cited by examiner

*Primary Examiner*—James Sells
(74) *Attorney, Agent, or Firm*—Sughrue Mion, PLLC

(57) ABSTRACT

Disclosed is a method for welding tape cartridge reels, with ensuring a high level of parallelism between both their flange portions. Specifically, this method for welding a tape cartridge reel, the tape cartridge reel including a flange having a welding rib and a flange-integrated reel hub, the method includes: pressing the flange against the flange-integrated reel hub by using an ultrasonic horn, while vibrating the flange by means of an ultrasonic wave from the ultrasonic horn, so that the flange is welded to the flange-integrated reel hub through the welding rib; and terminating a welding operation of the ultrasonic horn, while the flange is in contact with the flange-integrated reel hub only through the welding rib.

8 Claims, 4 Drawing Sheets

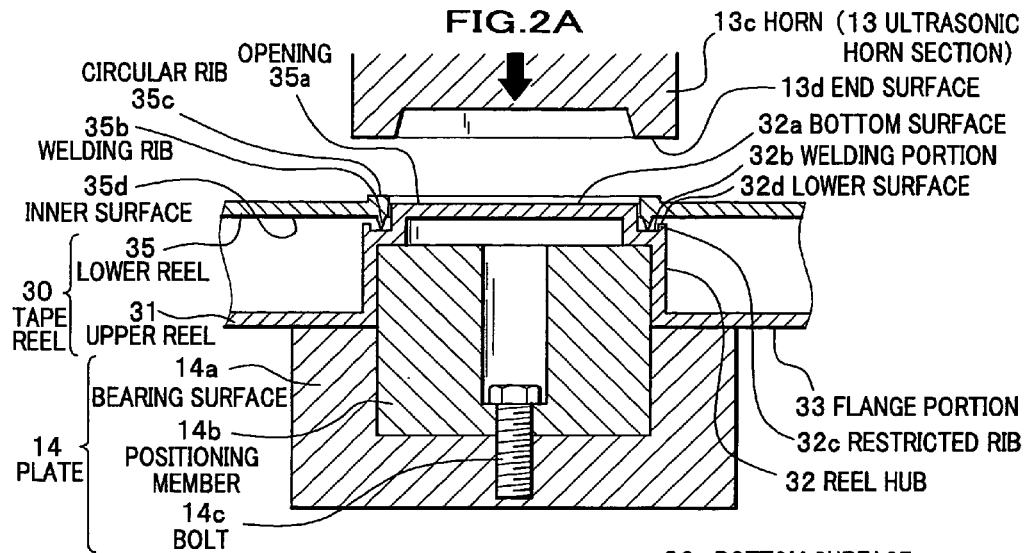
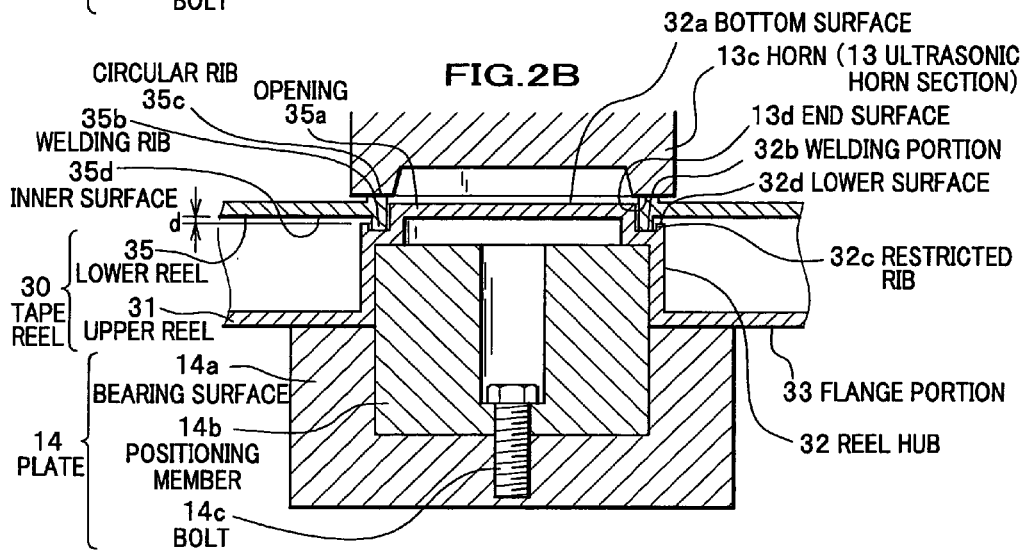
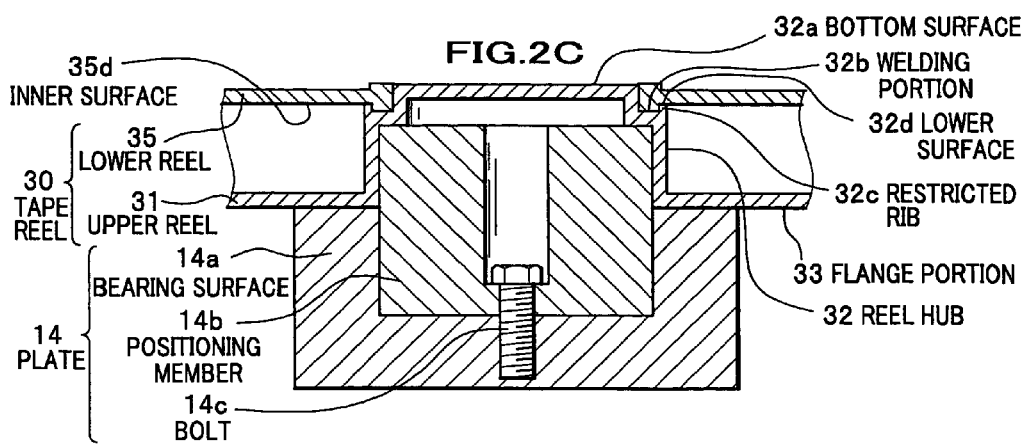

METHOD FOR WELDING TAPE CARTRIDGE REEL

BACKGROUND OF THE INVENTION

1. Field of the Invention

A method consistent with the present invention relates to a method for welding a tape cartridge reel composed of a flange and a flange-integrated reel hub. More specifically, a method consistent with the present invention relates to a method for welding a tape cartridge reel, by which a flange is welded to a flange-integrated reel hub by means of ultrasonic vibration.

2. Description of the Related Art

Magnetic tape cartridges contain a magnetic tape used in such applications as computer recording media and video tapes, and a reel on which a magnetic tape is to be wound is accommodated in them. This reel is composed of a flange and a flange-integrated reel hub. Together they are joined by means of ultrasonic welding.

In recent years, the high information recording density design of magnetic tapes has developed. As a result from this development, magnetic tape drives, which play magnetic tapes, need to control the position of magnetic tapes with high accuracy. To ensure this high level position control, both flanges of the magnetic tape cartridges, which function as guides for winding tapes regularly, are required to have the parallelism of a predetermined level. To maintain this level, a magnetic tape cartridge reel equipped with a restricted rib was conceived (see Japanese Unexamined Patent Application 2000-173229. Herein, this reel is called "tape reel" as appropriate. This restricted rib is aimed at preventing the deflections of both flanges in a welding process.

FIGS. 4A to 4C are cross-sectional views depicting individual processes for welding a conventional tape reel. Note that an upper reel 101 is positioned upwardly in an assembly state, but it is positioned downwardly in this figure.

Referring to FIG. 4A, a tape reel 100 is formed by joining a lower reel 102 and the upper reel 101 together by means of ultrasonic welding.

The upper reel 101 is composed of a reel hub 103 and a flange portion 104. The reel hub 103, on which a magnetic tape is to be wound, is a cylindrical member having a bottom, and the flange portion 104 protrudes outwardly from the upper edge (the lower edge in this figure) of the reel hub 103. The reel hub 103 and the flange portion 104 are formed of an integrally-molded synthetic resin. Near the rim of the reel hub 103, a welding portion 103a that is an annular-shaped groove is formed. In addition, on the rim of the welding portion 103a, a restricted rib 103b on which the lower reel 102 will abut is formed.

The lower reel 102 is a plate shaped member, and has an opening 102a and a welding rib 102b. The opening 102a is formed at the center of lower reel 102. The welding rib 102b has a substantially triangle cross-section, and is formed facing the welding portion 103a of the upper reel 101. Near the rim of the opening 102a, a circular rib 102c that protrudes in the opposite direction of the welding rib 102b is formed. On the circular rib 102c, an ultrasonic horn 105 will abut, and the circular rib 102c thereby receives the ultrasonic vibration from the ultrasonic horn 105. Also, the pressure from the ultrasonic horn 105 is exerted on the welding rib 102b.

Next, a description will be given below of a method by which the tape reel 100 configured above is assembled. Referring to FIG. 4A again, the lower reel 102 is placed on the reel hub 103. Subsequently, as shown in FIG. 4B, a circular-shaped front surface 105a of the ultrasonic horn 105 vibrates the circular rib 102c of the lower reel 102 by means of an ultrasonic wave, and at the same time, applies pressure to the welding rib 102b. As a result, the welding rib 102b is melted, and is then joined to the welding portion 103a of the reel hub 103. In this welding process, after the welding rib 102b is melted, the lower reel 102 abuts on the restricted rib 103b of the reel hub 103, and is thereby fixed by this restricted rib 103b.

In the above conventional welding method, there are the following disadvantages.

The pressure of the ultrasonic horn 105, the amplitude of the ultrasonic wave and the welding time are all set beforehand, and the tape reel 100 needs to be welded under these constant conditions. In addition, the ultrasonic horn 105 causes a mechanical delay. Accordingly, it is difficult to control the ultrasonic horn 105 in such a way that it stops at the moment when the lower reel 102 abuts on the restricted rib 103b.

In the tape reel 100, the circular rib 102c (on which the ultrasonic horn 105 abuts) and the restricted rib 103b (on which the lower reel 102 abuts) are not aligned with each other horizontally.

Therefore, as shown in FIG. 4C, if the ultrasonic horn 105 keeps pressing the circular rib 102c even after the lower reel 102 abuts on the restricted rib 103b of the reel hub 103, then the rib portion of the lower reel 102 may be bent upwardly with respect to the restricted rib 103b as a fulcrum. Consequently, the precision of the parallelism between both flange portions are deteriorated.

The present invention has been conceived, taking the above disadvantages into account. An object of the present invention is to provide a method for welding tape cartridge reels with ensuring a high level of parallelism between both their flange portions.

SUMMARY OF THE INVENTION

According to an aspect of the present invention, there is provided, a method for welding a tape cartridge reel, the tape cartridge reel including a flange having a welding rib and a flange-integrated reel hub, the method including:

(1) pressing the flange against the flange-integrated reel hub by using an ultrasonic horn, while vibrating the flange by means of an ultrasonic wave from the ultrasonic horn, so that the flange is welded to the flange-integrated reel hub through the welding rib; and (2) terminating a welding operation of the ultrasonic horn, while the flange is in contact with the flange-integrated reel hub only through the welding rib.

According to another aspect of the present invention, there is provided, a tape cartridge reel including:

(a) a flange;

(b) a flange-integrated reel hub;

(c) a welding rib only through which the flange and the flange-integrated reel hub are welded to each other, the welding rib being provided on the flange; and (d) a clearance formed between inner surfaces of the flange-integrated reel hub and the flange.

The welding operation of the ultrasonic horn is terminated while the flange is in contact with the flange-integrated reel hub only the welding rib. This makes it possible to ensure that the flange is prevented from being bent. Even if the welding rib stays melted after the termination of the welding operation of the ultrasonic horn, then the flange and the flange-integrated reel hub are kept in contact with each other only through the welding rib. This prevents the inner surfaces of the flange and the flange-integrated reel hub from abutting on each other, thereby preventing the flange from being bent.

In this case, in order to terminate the welding operation, the pressing of the ultrasonic horn is released, or alternatively the ultrasonic wave from the ultrasonic horn is stopped.

It is preferable that the welding operation of the ultrasonic horn is terminated so that a clearance of 5 μm to 50 μm is left between the inner surfaces of the flange-integrated reel hub and the flange. If the clearance is less than 5 μm, the inner surfaces of the flange-integrated reel hub and the flange may abut directly on each other. This may cause the bending of the flange. On the other hand, if the clearance is more than 5 μm, a magnetic tape wound around the reel hub may be caught into the space between the flange-integrated reel hub and the flange.

Furthermore, prior to the termination of the welding operation of the ultrasonic horn, amplitude of the ultrasonic wave from the ultrasonic horn or pressure exerted on the flange is made lower than that at an early stage of the welding operation of the ultrasonic horn.

The amplitude of the ultrasonic wave from the ultrasonic horn is switched at these two levels. Thus, at the early stage of the welding operation, the welding rib is efficiently melted by means of the ultrasonic wave of the high amplitude. Further, shortly before the termination of the welding operation, the viscosity of the welding rib is increased by means of the ultrasonic wave of the low amplitude, thereby facilitating the positioning of the flange.

Alternatively, the pressure exerted on the flange is switched at the two levels. Thus, at the early stage of the welding operation, the welding rib is efficiently pressed at the high pressure. Further, shortly before the termination of the welding operation, the viscosity of the welding rib is increased due to the low pressure, thereby facilitating the positioning of the flange.

Consequently, it is possible to fabricate tape cartridge reels with great accuracy, and to reduce the variation in the quality of tape cartridge reels.

In conclusion, by applying the method for welding tape cartridge reels, it is possible to fabricate tape cartridge reels with a high level of parallelism between both their flange portions.

BRIEF DESCRIPTION OF THE DRAWINGS

For more complete understanding of the present invention and the advantages hereof, reference is now made to the following description taken in conjunction with the accompanying drawings wherein:

FIG. 2A is a view explaining a welding method according to the embodiment;

FIG. 2B is a view explaining the welding method according to the embodiment;

FIG. 2C is a view explaining the welding method according to the embodiment;

DETAILED DESCRIPTION OF THE EXEMPLARY EMBODIMENTS OF THE INVENTION

A description will be given below in detail of an embodiment of the present invention, with reference to accompanying drawings as appropriate.

Figure 1:
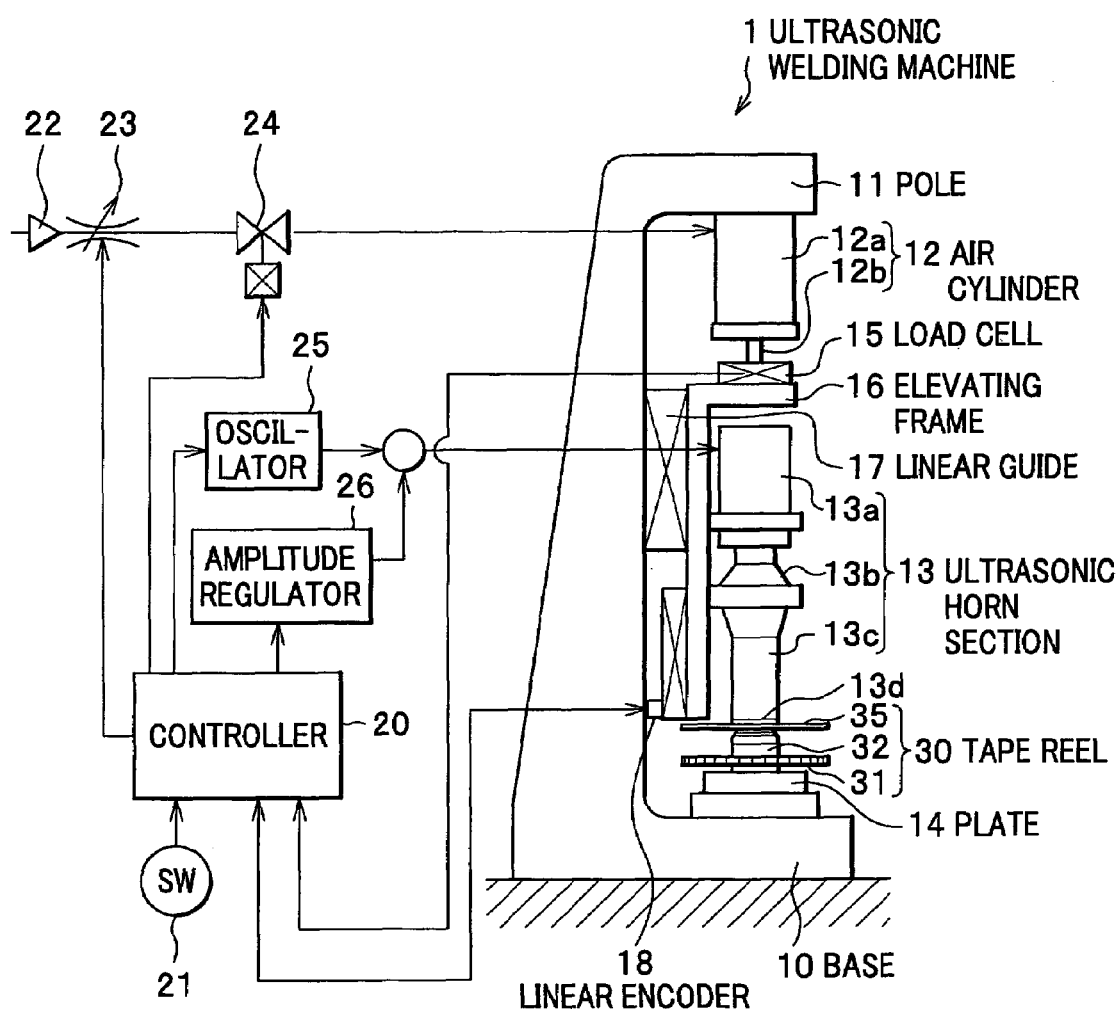
FIG. 1 is a view depicting a configuration of an ultrasonic welding machine according to an embodiment of the present invention.

Referring to FIG. 1, an ultrasonic welding machine 1 includes, as main components, (1) a base 10; (2) a pole 11 integrated with the base 10; (3) an air cylinder 12 coupled to the pole 11 and extending therefrom downwardly; (4) an ultrasonic horn section 13 moving in relation to the air cylinder 12; (5) a tape reel 30; and (6) a plate 14 which is positioned under the ultrasonic horn section 13 and on which the tape reel 30 is placed.

The air cylinder 12 is composed of an air cylinder main body 12a and a plunger 12b protruding therefrom, and is coupled to the ultrasonic horn section 13 through a load cell 15 and an elevating frame 16.

The ultrasonic horn section 13 produces an ultrasonic wave, so that a lower reel 35 and an upper reel 31 are vibrated due to the ultrasonic wave, and are then welded together because of frictional heat generated by the vibration. This ultrasonic horn section 13 includes a converter 13a, a booster 13b and a horn 13c abutting on the lower reel 35. This horn 13c has a disc that will abut on the circular rib 35c of the tape reel 30 (see FIG. 3). The elevating frame 16 can move vertically along a linear guide 17 placed on the inner side of the pole 11, and is equipped with a linear encoder 18 for sensing the position of an end surface 13d.

Referring to FIGS. 2A to 2C, the plate 14 is constituted of:

(a) a bearing surface 14a, being a circular member with a bottom, which supports the flange of the upper reel 31 and which receives load during the welding process;

(b) a positioning member 14b fitted into the recess of the bearing surface 14a and covered by a bottom surface 32a of a reel hub 32 of the tape reel 30 to thereby fix the tape reel 30; and (c) a bolt 14c which joins the circular bearing surface 14a and the positioning member 14b together.

On the plate 14, the upper reel 31 described in detail later is placed, and on the upper reel 31, the lower reel 35 is placed. Further, the ultrasonic horn section 13 moves down to the lower reel 35, and presses the lower reel 35 against the lower reel 31, and at the same time, transmits ultrasonic vibration to them. Consequently, both reels 31 and 35 are welded by means of the frictional heat generated by the ultrasonic vibration. Note that details of the welding method will be described later.

The ultrasonic welding machine 1 configured above further includes a controller 20 as shown in FIG. 1. This controller 20 controls the movement of the air cylinder 12 and the operation of the ultrasonic horn section 13. Once a start switch 21 is turned on, the controller 20 monitors the load of the air cylinder 12 through the load cell 15, and simultaneously adjusts the pressure of the air supplied from the air supply source 22 through the pressure regulator 23.

Subsequently, the controller 20 adjusts the open/close of the solenoid valve 24 so that the air cylinder 12 moves.

If the solenoid valve 24 is turned on, then the plunger 12b of the air cylinder 12 protrudes from the air cylinder main body 12a. The ultrasonic horn section 13 then moves down through the elevating frame 16.

Otherwise, if the solenoid valve 24 is turned off, the plunger 12b of the air cylinder 12 is inserted into the air cylinder main body 12a. The ultrasonic horn section 13 then moves up through the elevating frame 16.

The controller 20 determines whether or not the end surface 13d of the horn 13c abuts on the circular rib 35c of the lower reel 35, based on the load sensed by the load cell 15. If it is determined that the end surface 13d abuts on the circular rib 35c, then the controller 20 resets the linear encoder 18 to an initial value. Note that the current position of end surface 13d of the horn 13c is defined as an initial position.

In addition, when the start switch 21 is turned on, the controller 20 monitors the position of end surface 13d of the horn 13c through the linear encoder 18. At the same time, the controller 20 activates an oscillator 25 and uses an amplitude regulator 26 to adjust the frequency of output of the oscillator 25, so that the ultrasonic horn section 13 operates.

Further, when determining the end surface 13d moves from the initial position to a predetermined position, the controller 20 shuts down the oscillator 25 to thereby stop the oscillation of the ultrasonic horn section 13. Also, the controller 20 turns off the solenoid valve 24 to thereby move the horn 13c away from the lower reel 35.

Figure 3:
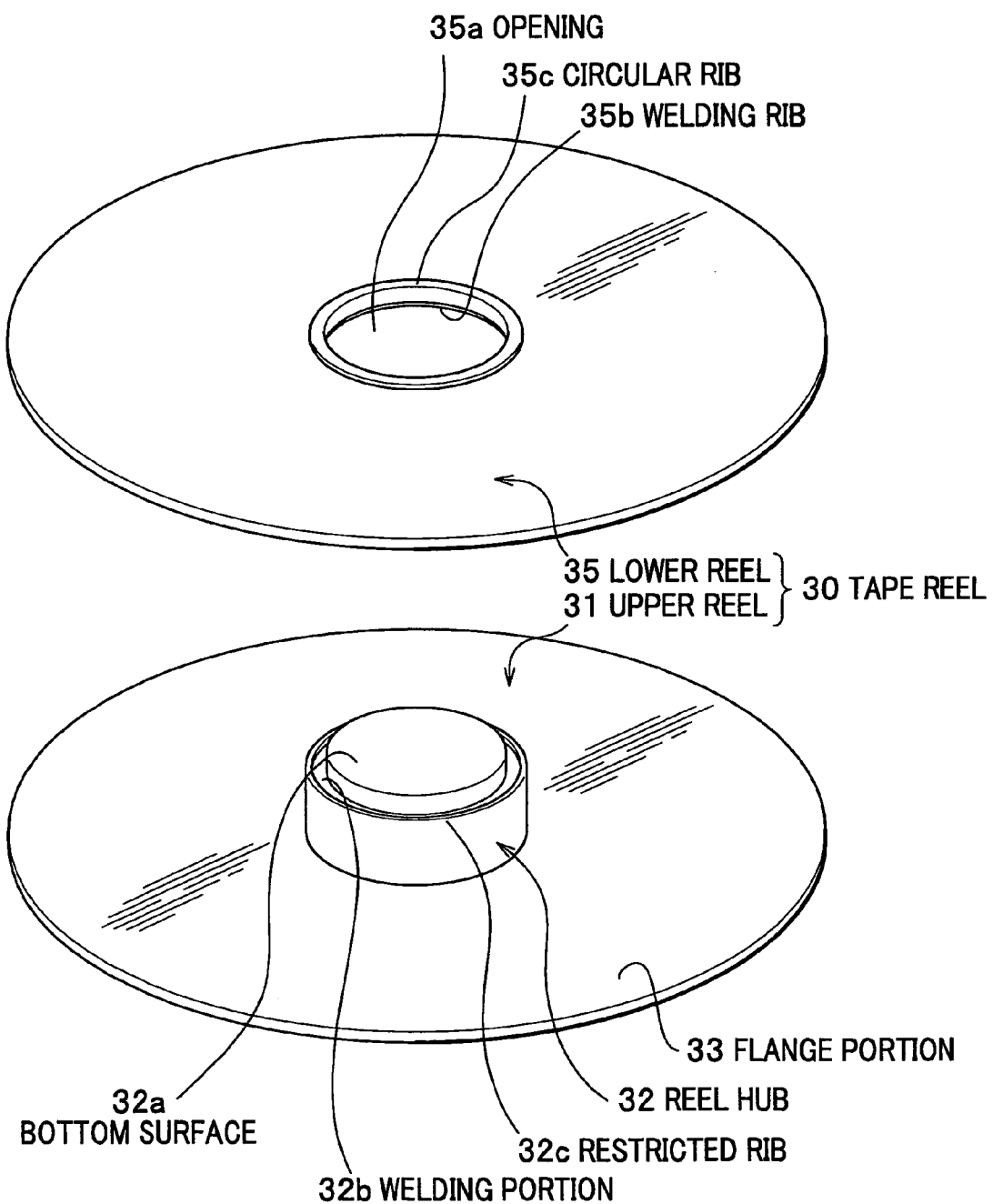
FIG. 3 is a view depicting an exploded perspective view of a tape reel according to the embodiment of the present invention.
Figure 4A:
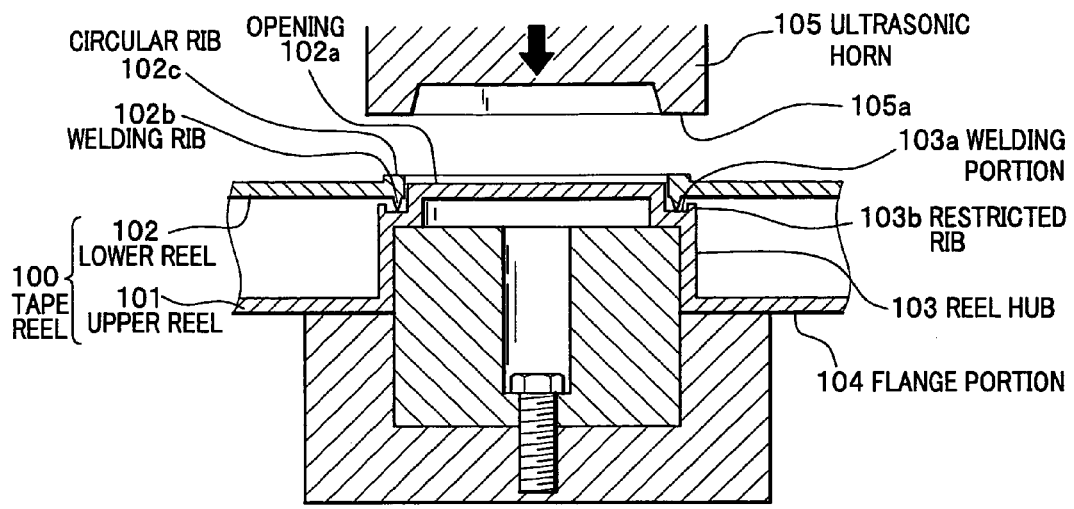
FIG. 4A is a view explaining a conventional welding method.
Figure 4B:
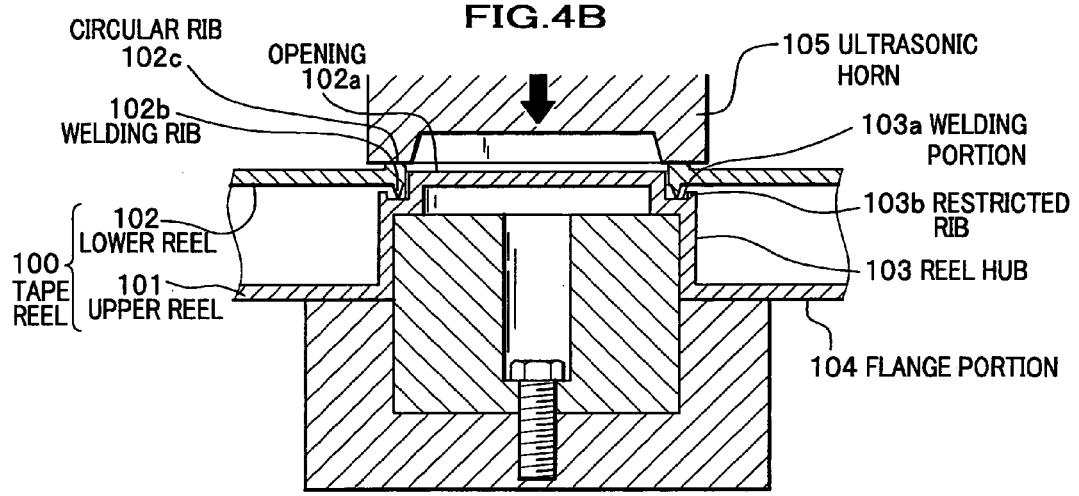
FIG. 4B is a view explaining the conventional welding method.
Figure 4C:
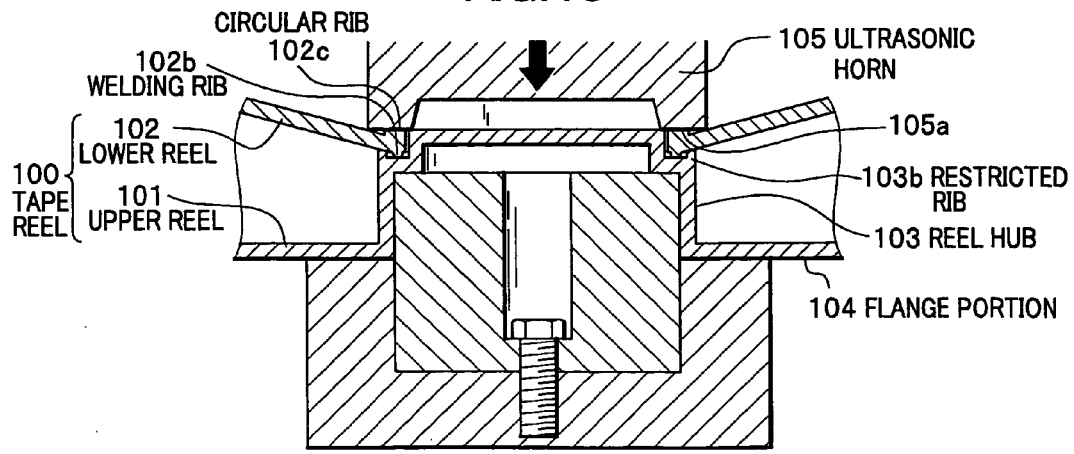
FIG. 4C is a view explaining the conventional welding method.

Next, a description will be given below of the configuration of the tape reel 30, with reference to FIG. 3.

The tape reel 30 is formed by welding the upper reel 31 to the lower reel 35. Note that the upper reel 31 is positioned upwardly in an assembly state, but it is shown downwardly in this figure, similar to other figures.

The upper reel 31 includes the reel hub 32 and the flange portion 33; the reel hub 32 to which a magnetic tape is to be wound has a cylindrical shape with a bottom, and the flange portion 33 radiates from the reel hub 32 in all directions. The reel hub 32 and the flange portion 33 are formed of an integrally-molded synthetic resin. Near the circumferential surface of the reel hub 32, a circular step, that is, a welding portion 32b is formed. On the rib of the welding portion 32b, the restricted rib 32c is formed and it is positioned below the bottom surface 32a (see FIG. 2A).

The disciform lower reel 35 has a circular opening 35a at the center through which the bottom surface 32a is to be passed. The lower reel 35 has a welding rib 35b having a substantial triangle cross-section and facing the welding portion 32b of the upper reel 31. On the rib of the opening 35a, the circular rib 35c protruding in the opposite direction of the welding rib 35b is formed. The circular rib 35c (on which the horn 13c of the ultrasonic horn section 13 will abut) will receive the ultrasonic vibration and the pressure from the horn 13c. In addition, the circular rib 35c transmits them to the welding portion 32b.

A description will be given of a method by which the ultrasonic welding machine 1 configured above welds the tape reel 30 according to this embodiment.

First, an operator places the upper reel 31 on the bearing surface 14a so as to cover the positioning member 14b, as shown in FIG. 2A. The operator then places the lower reel 35 on the reel hub 32 in such a way that the reel hub 32 fits into the opening 35a. Consequently, the welding rib 35b abuts on the welding portion 32b.

Next, once the start switch 21 is turned on, the controller 20 turns on the solenoid valve 24. In response to this, the plunger 12b of the air cylinder 12 protrudes from the air cylinder main body 12a, and the ultrasonic horn section 13 then moves downwardly. Subsequently, the controller 20 monitors the load of the air cylinder 12 through the load cell 15, and determines whether or not the end surface 13d of the horn 13c abuts on the circular rib 35c of the lower reel 35, based on the load monitored.

If it is determined that the end surface 13d of the horn 13c abuts on the circular rib 35c of the lower reel 35, then the controller 20 resets the linear encoder 18 to an initial value. Note that the current position of the horn 13c is defined as an initial position. Subsequently, the controller 20 activates the oscillator 25, and the horn 13c then vibrates the lower reel 35 by means of the ultrasonic wave, while pressing it. As a result, the welding rib 35b and the welding portion 32b are rubbed against each other, and are then melted, so that they are welded to each other.

Further, the controller 20 moves the end surface 13d of the horn 13c downwardly from the initial position to a predetermined position. When it is determined that the end surface 13d reaches to the predetermined position, based on the load of the linear encoder 18 (FIG. 2B), the controller 20 shuts down the oscillator 25 to stop the vibration, so that the welding operation of the ultrasonic horn section 13 is terminated. Following this, the controller 20 turns off the solenoid valve 24, so that the horn 13c moves away from the lower reel 35. In this embodiment, in order to terminate the welding operation of the ultrasonic horn section 13, the oscillation of the horn 13 is stopped. However, the pressing of the horn 13c may be released instead, or alternatively, the oscillation of the horn 13 is stopped, as well as the pressing of the horn 13 is released.

Note that, when the end surface 13d of the horn 13c is located at the predetermined position, a clearance d is ensured between an inner surface 35d of the lower reel 35 and a lower surface 32d of the restricted rib 32c. In other words, the lower reel 35 and the reel hub 32 can be in contact with each other only through the welding rib 35b. In this case, the determination whether or not the end surface 13d of the horn 13c reaches to the predetermined position is made based on how far the end surface 13d moves relative to the position of the end surface 13d of the horn 13c, the position of the end surface 13d being monitored by the linear encoder 18.

It is preferable that the clearance d is set to 5 µm to 50 µm. If the clearance d is less than 5 µm, the inner surface 35d of the lower reel 35 and the lower surface 32d of the reel hub 32 may abut directly on each other. This causes the bending of the lower reel 35. On the other hand, if the clearance d is more than 5 µm, a magnetic tape wound around the reel hub 3 may be caught into the space between the reel hub 32 and the lower reel 35.

As shown in FIG. 2C, the lower reel 35 is positioned close to the reel hub 32. Further, the lower reel 35 abuts on the restricted rib 32c of the reel hub 32, and is fixed by the restricted rib 32c. In this state, the welding of the welding rib 35b is completed.

With the welding method according to this embodiment, the end surface 13d of the horn 13c does not press the lower reel 35 anymore, after the lower reel 35 abuts on the restricted rib 32c. Consequently, the rib portion of the lower reel 35 is not bent upwardly with respect to the restricted rib 32c as a fulcrum. In other words, it is possible to ensure a high level of parallelism between both flange portions.

Up to this point, the embodiment of the present invention has been described. However, the following modifications can be conceived.

In this embodiment, the air pressure controlled by the pressure regulator 23 and the frequency (amplitude) controlled by the amplitude regulator 26 are set to respective constant values over the whole of the welding operation. However, they may be attenuated to values less than initial values, respectively, prior to the stopping of the welding operation. Attenuating the pressure of the horn 13c facilitates the position control of the lower reel 35. In addition, attenuating the amplitude of the horn 13c makes the viscosity of the welding rib 35b higher, thereby facilitating the position control of the lower reel 35.

Furthermore, in this embodiment, a mean for moving the ultrasonic horn section 13 is not addressed, but it may be any moving means as long as the ultrasonic horn section 13 can move vertically. Examples of such a moving means include an air cylinder, a stepping motor and a servo motor.

Moreover, in this embodiment, the welding rib 35b is formed on the lower reel 35, but may be on the upper reel 31 instead.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A method for welding a tape cartridge reel, the tape cartridge reel including a flange having a welding rib and a flange-integrated reel hub, the method comprising:
    pressing the flange against the flange-integrated reel hub by using an ultrasonic horn, while vibrating the flange by means of an ultrasonic wave from the ultrasonic horn, so that the flange is welded to the flange-integrated reel hub through the welding rib; and
    terminating a welding operation of the ultrasonic horn, while the flange is in contact with the flange-integrated reel hub only through the welding rib.

2. The method according to claim 1,
    wherein the welding operation of the ultrasonic horn is terminated by releasing the pressing of the ultrasonic horn or by stopping the ultrasonic wave from the ultrasonic horn.

3. The method according to claim 1,
    wherein the welding operation of the ultrasonic horn is terminated so that a clearance ranging from 5 μm to 50 μm is left between inner surfaces of the flange-integrated reel hub and the flange.

4. The method according to claim 2,
    wherein the welding operation of the ultrasonic horn is terminated so that a clearance ranging from 5 μm to 50 μm is left between inner surfaces of the flange-integrated reel hub and the flange.

5. The method according to claim 1,
    wherein, prior to the termination of the welding operation of the ultrasonic horn, amplitude of the ultrasonic wave from the ultrasonic horn or pressure exerted on the flange is made lower than that at an early stage of the welding operation of the ultrasonic horn.

6. The method according to claim 2,
    wherein, prior to the termination of the welding operation of the ultrasonic horn, amplitude of the ultrasonic wave from the ultrasonic horn or pressure exerted on the flange is made lower than that at an early stage of the welding operation of the ultrasonic horn.

7. The method according to claim 3,
    wherein, prior to the termination of the welding operation of the ultrasonic horn, amplitude of the ultrasonic wave from the ultrasonic horn or pressure exerted on the flange is made lower than that at an early stage of the welding operation of the ultrasonic horn.

8. The method according to claim 4,
    wherein, prior to the termination of the welding operation of the ultrasonic horn, amplitude of the ultrasonic wave from the ultrasonic horn or pressure exerted on the flange is made lower than that at an early stage of the welding operation of the ultrasonic horn.

* * * * *